United States Patent [19]

Kawashima et al.

[11] 4,390,966

[45] Jun. 28, 1983

[54] SEQUENCE CONTROLLER

[75] Inventors: Keisuke Kawashima, Nagaokakyo; Yoshitane Saito, Kameoka; Akihiro Yamada, Kyoto; Satoshi Yano, Nagaokakyo, all of Japan

[73] Assignee: Omron Tateisi Electronics Co., Kyoto, Japan

[21] Appl. No.: 169,218

[22] Filed: Jul. 15, 1980

[30] Foreign Application Priority Data

Jul. 23, 1979 [JP] Japan .................................. 54-93484

[51] Int. Cl.³ ............................................ G06F 15/46
[52] U.S. Cl. ................................................... 364/900
[58] Field of Search ... 364/200 MS File, 900 MS File, 364/131, 136, 140, 141; 340/825.22, 825.23

[56] References Cited

U.S. PATENT DOCUMENTS 3,982,230  9/1976  Burkett et al. ..................... 364/900
4,183,089  1/1980  Daughton et al. .................. 364/900

*Primary Examiner*—Thomas M. Heckler
*Attorney, Agent, or Firm*—Wegner & Bretschneider

[57] ABSTRACT

A sequence controller for parallel and other operations by way of mutual interlocking with other controllers is disclosed having flags which may be set and reset not only by predetermined user instructions therein but also by user instructions in another equivalent controller connected thereto by a common bus, and controlling the flags so that the statuses of the flags may be evaluated in accordance with predetermined user instructions and utilized as operational conditions.

3 Claims, 4 Drawing Figures

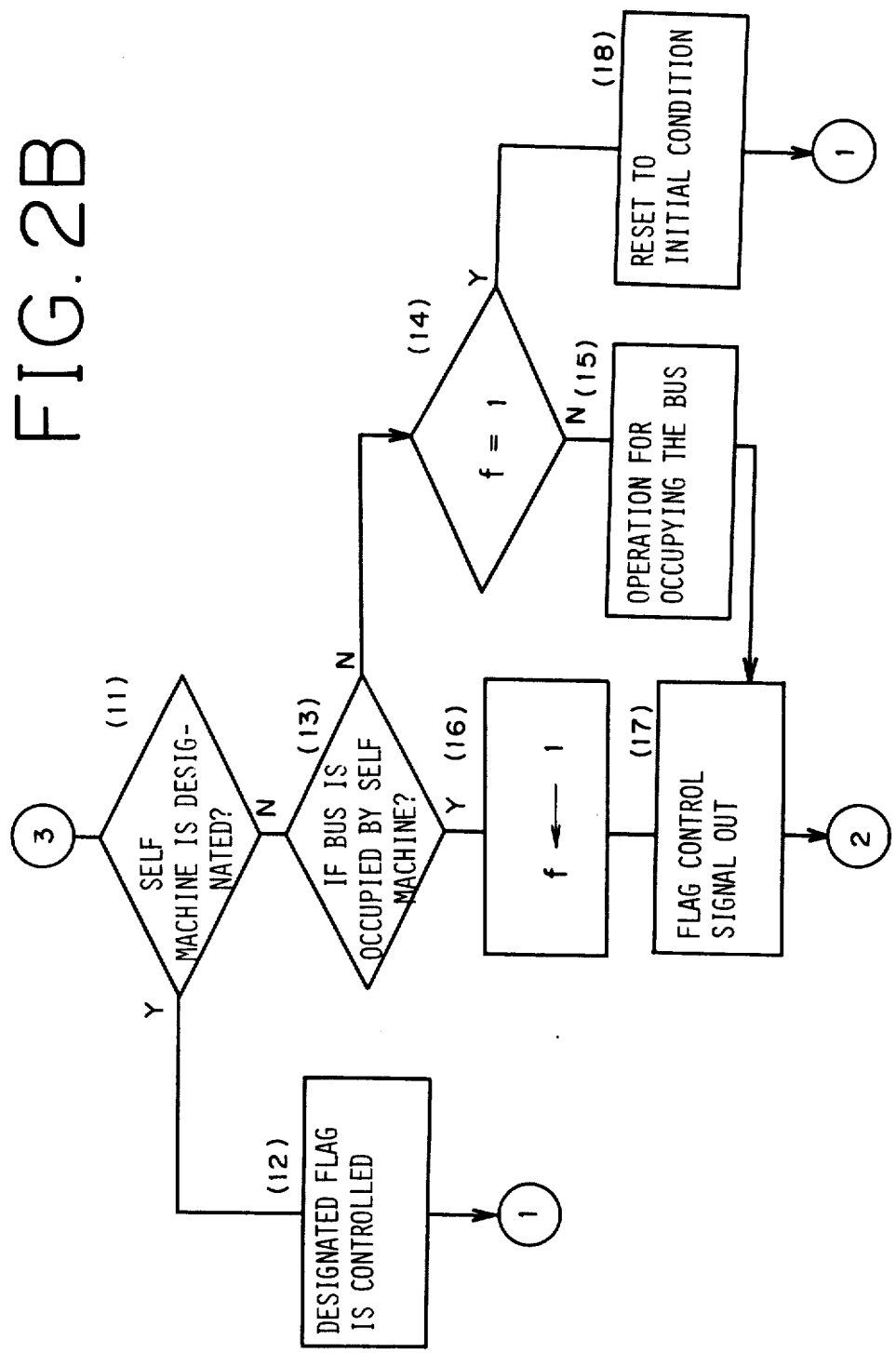

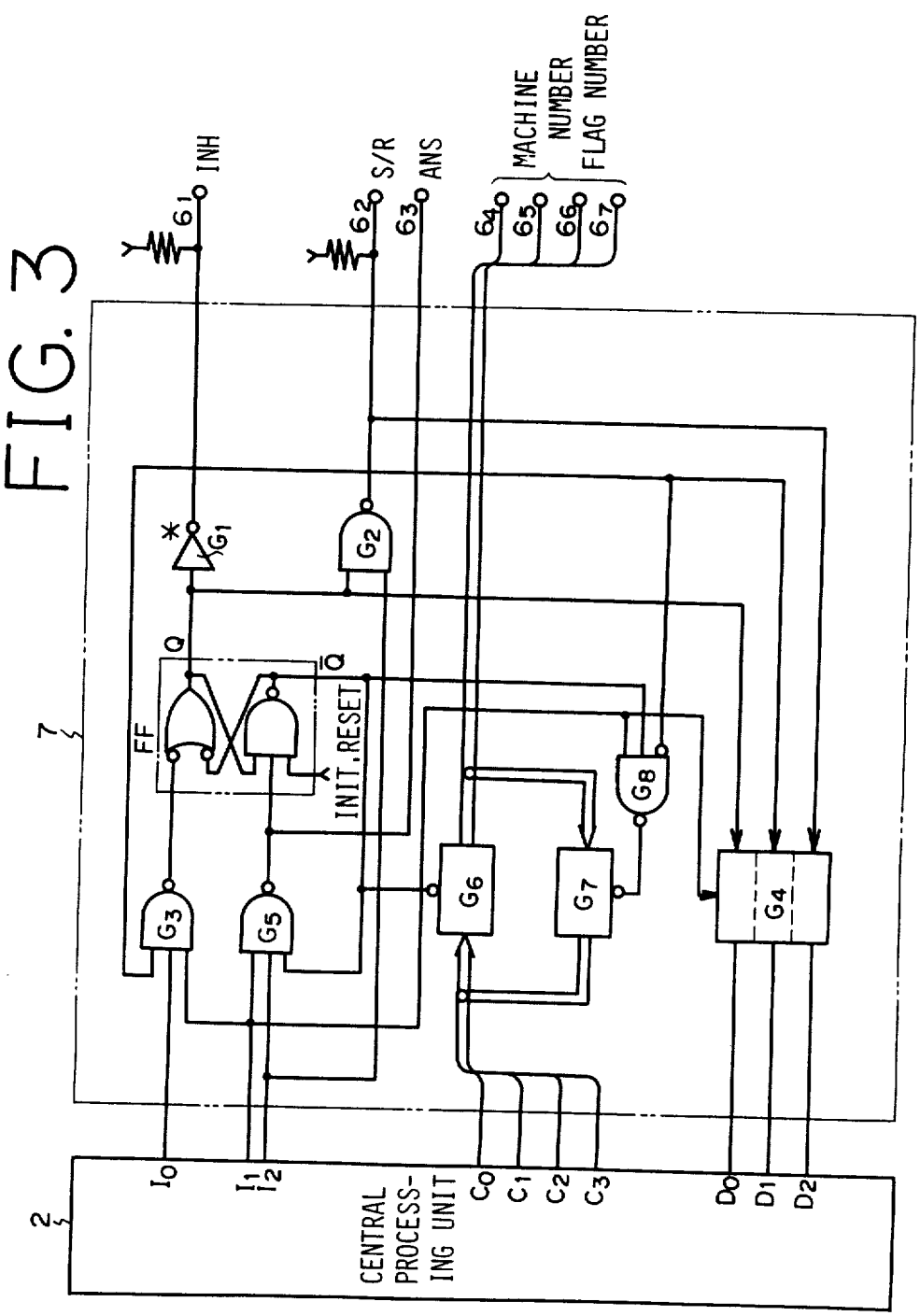

SEQUENCE CONTROLLER

BACKGROUND OF THE INVENTION

This invention relates to a sequence controller of the sequentially stored program type, and more particularly, to a system comprising a plurality of identically structured sequence controllers which is capable of parallel and other operations by way of mutual interlocks.

There has been available a large-scale sequence controller having very large numbers of program steps and input and output points, wherein its maximum available number of program steps is divided into several to perform the equivalent of parallel operations.

However, such equipment is very much costly because of the large numbers of steps and input-output points involved and is not only wasteful for users who need not utilize the full potential of its scale but is not flexible enough to allow an increase or decrease of scale. In this connection, it is obviously desirable that the desired control functions be obtainable by purchasing only the necessary number of controllers which are reasonably small-scaled and low-priced. However, the conventional small-scale controllers are virtually incapable of complicated parallel operations, for when a plurality of units are utilized to perform such control operations as interlocking to other machines or capturing certain process signals in other machines and carrying out operations on its own, inputs, outputs and interrupt inputs must be allocated for such purposes and, moreover, one machine exerts influences on the other machines.

To solve the above problem, this invention provides a sequence controller including flaps, each of which may be a one-bit memory and which may be set and reset not only by predetermined user instructions in one controller but also by user instructions in another controller connected to said one controller by a common bus, and means for controlling said flags, in such a manner that the statuses of said flags may be evaluated in accordance with predetermined user instructions and utilized as operational conditions.

BRIEF DESCRIPTION OF THE DRAWINGS

FIGS. 2A and 2B combine to form a flow chart showing the basic operations of said sequence controller, and FIG. 3 is a block diagram showing a typical flag control circuit in said sequence controller.

DETAILED DESCRIPTION OF THE PREFERRED EMBODIMENTS

This invention will now be described in detail, reference being had to the accompanying drawings which depict a preferred embodiment of the invention.

Figure 1:
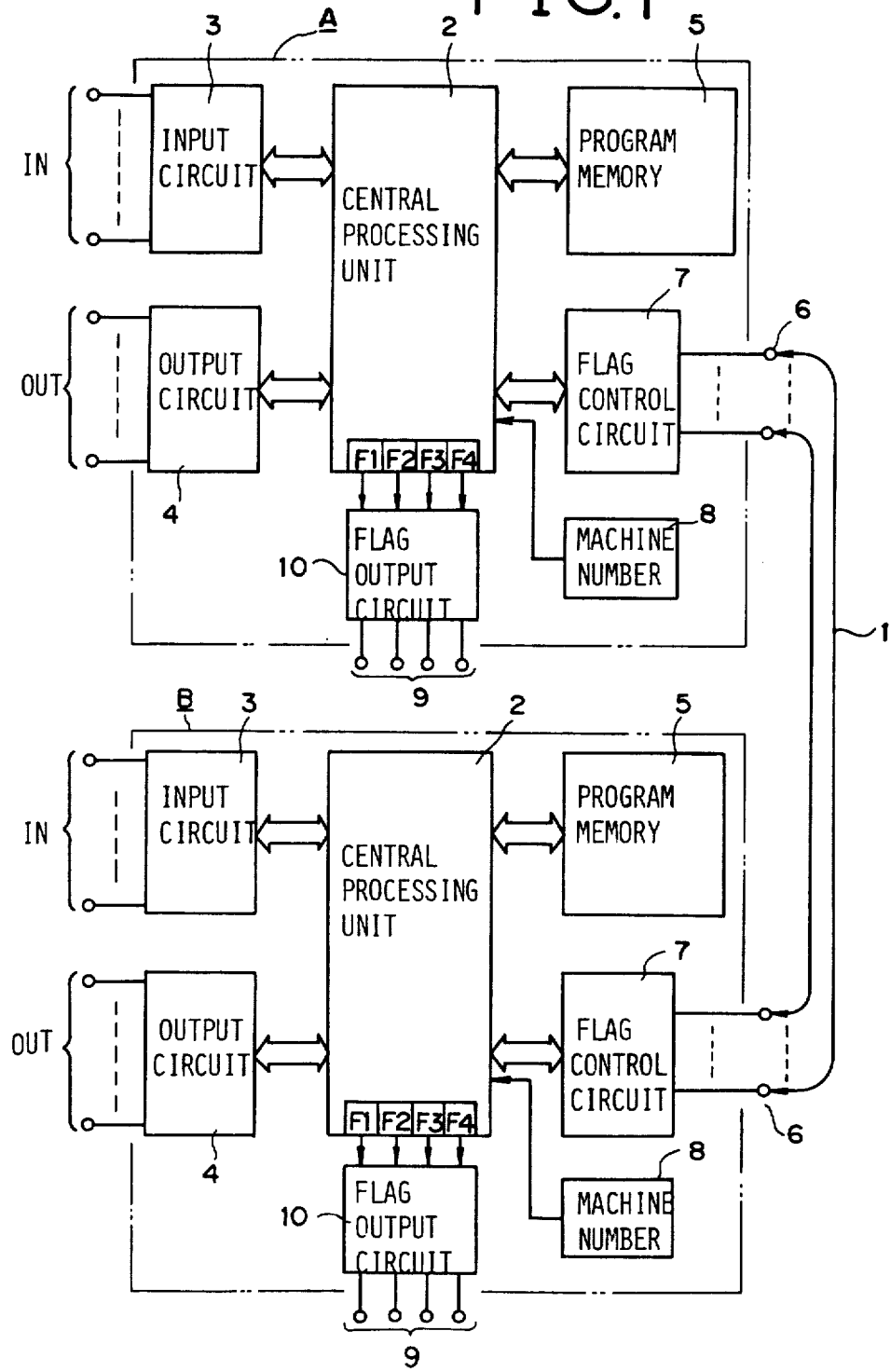
FIG. 1 is a block diagram showing a couple of sequence controllers as interconnected via a flag control bus in a system according to this invention.

In FIG. 1 are shown a couple of identical sequence controllers A and B which are used in accordance with this invention. The two units are connected to each other through a flag control bus 1 (briefly, bus 1) which will hereinafter be described in detail. The sequence controllers A and B, respectively, comprises a central processing unit 2 which is a firmware in the form of a microcomputer, an input circuit 3 interfacing said central processing unit 2, with an external contact point connected to input terminal IN, an output circuit 4 for controlling an external equipment connected to an output terminal OUT in accordance with output signals from said central processing units 2, a program memory 5 which memorizes a sequence program arbitrarily entered by the user, a flag control circuit 7 having input-output terminals 6, a machine number setting device 8 for setting the identification numbers of controllers, and a flag output circuit 10 for outputting switching outputs corresponding to the statuses of four flags $F_1$ through $F_4$ set in central processing unit 2 through flag output terminals 9. In addition to the above-mentioned components, each sequence controller in this system further includes, though not shown in the drawings, a keyboard used in writing a program into the program memory 5, a display unit for displaying the user instruction for each step and a display unit for displaying the period and output statuses, among others. It should be understood that the external equipment can be operated by the output of flag output circuit 10.

The user instruction for each process step in the above sequence controller system consists, as shown below, of [OP], a command code, [DATA-1] and [DATA-2] which modify the command code, and [OUT] which is the contents of output control which are to be outputted from output terminal OUT in the execution of the particular step.

The following is a brief explanation of general command codes and the contents of execution thereof in the sequence controller.

(a) [NOP]: "non-operation" command
   Do nothing but proceed to the next step
(b) [END]: "end" command.
   Means that one cycle of operation has been completed.
(c) [JMP]: "jump" command
   Jump to the step designated in [DATA-1] and continue execution from there on.
(d) [AND]: "and" command
   Proceed to the next step when the two inputs specified in [DATA-1] and [DATA-2], respectively, are concurrently available.
(e) [OR]: "or" command
   Proceed to the next step on reception of whichever earlier of the input signals specified in [DATA-1] and [DATA-2].
(f) [CNT]: "count" command
   Count signals from the input in [DATA-2] up to the number specified in [DATA-1] and, on counting-up, proceed to the next step.
(g) [CJP]: "conditional jump" command
   Jump to the step specified in [DATA-1] when the input specified in [DATA-2] is ON and proceed to the next step when it is OFF.
(h) [RPT]: "Repeat" command
   Repeat the operation from the step specified in [DATA-2] to the current step up to the number of times specified in [DATA-1].
(i) [TIM]: "Timer" command
   Proceed to the next step on lapse of the time specified in [DATA-1] and [DATA-2].

While the foregoing are well-known command codes, the following new command code is defined for the sequence controller according to this invention.

(j) [FSR]: "flag control" command
   Control the flag specified by [DATA-1] among the four flags $F_1$ through $F_4$ of the controller (including the very controller in question) having the machine number designated in [DATA-2] to the status (set or reset) specified by the byte of [DATA-1].

While the architecture and operations necessary for execution of said flag control command will be described below in detail, the scheme involved is, in brief, such that by using said flag control command, not only the flags of the principal (own) controller but also the flags of another controller connected via bus 1 can be freely set and reset. And in the case of a command to advance steps on condition of an input signal such as the above-mentioned AND or OR command, if a flag number of the principal machine is specified in [DATA-1] or [DATA-2], the status of the flag functions as an operational condition as does the input signal.

Figure 2A:
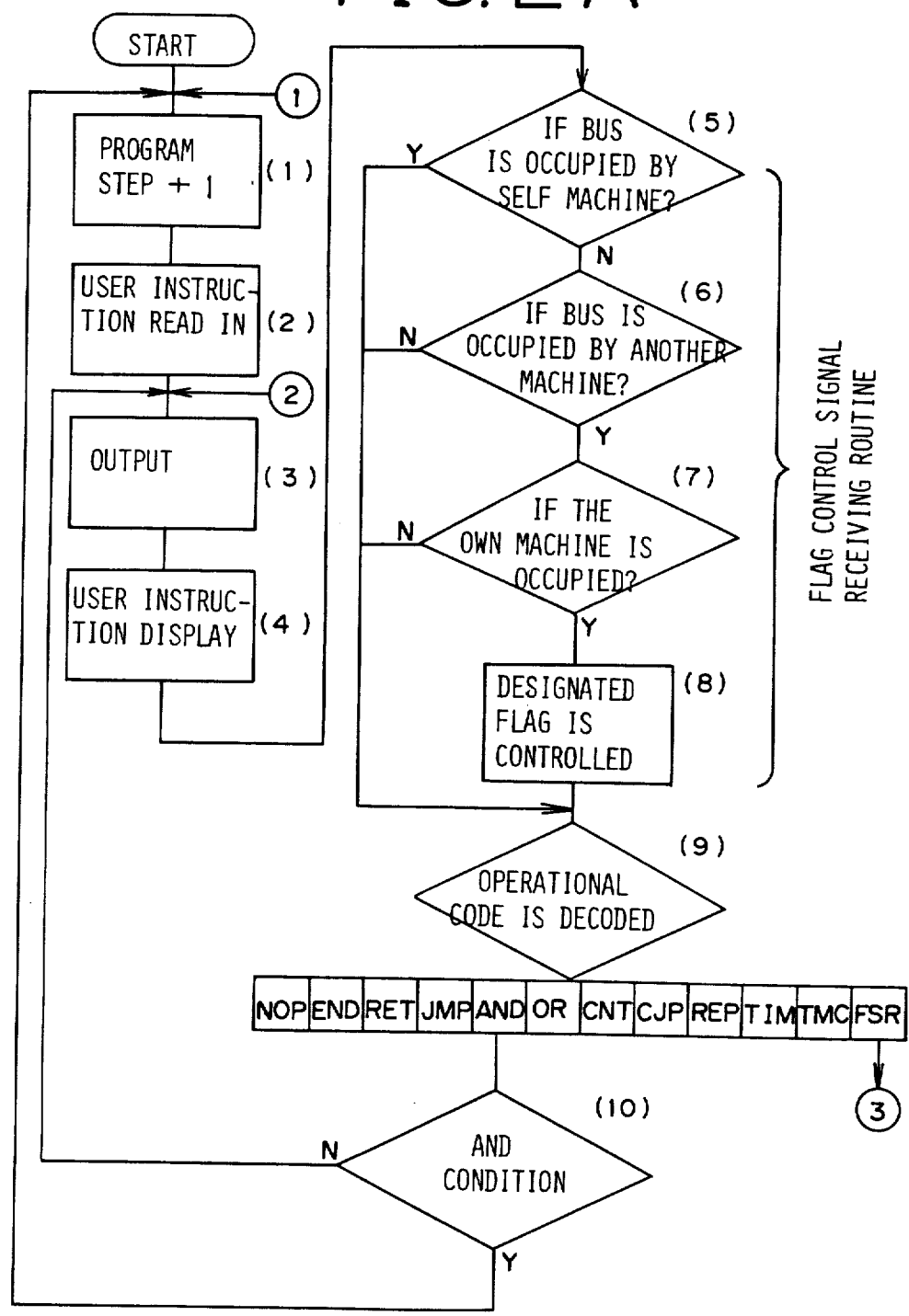

FIGS. 2A and 2B form a flow chart showing the basic operational sequence of the central processing unit 2, which is governed by a system program stored in ROM within the unit 2. Especially, the chart shows the flag control function as a main feature of this invention.

The controller A, i.e. the principal or own machine, will be the main subject of the following description which follows the sequence depicted in the same chart. First, in FIG. 2A, the program steps proceed according to routine (1) and, at routine (2), the user instruction at the step is read from the memory 5 into the central processing unit 2. In routine (3), the output control contents [OUT] of the read-in user instruction are sent to the output circuit 4 and the output status set by the user instruction is outputted from the output terminal OUT. At routine (4), the read-in user instruction is displayed alongside the step number.

The subsequent routines (5), (6), (7) and (8) are routines for receiving flag control signals from the other controller B to the principal controller A. First, at routine (5), it is examined whether the bus 1 is being occupied by the principal controller A. Thus, as will be discussed hereinafter, when a flag control signal is transmitted from the principal controller A to the other controller B, the bus 1 is occupied by the flag control circuit 7 of the principal controller A, and the routine (5) examines this status of flag control circuit 7. In an initial state, the judgement at routine (5) is NO and the sequence proceeds to routine (6).

In the routine (6), the status of a predetermined signal line of the bus 1 is examined to judge whether the bus 1 is occupied (used) by the other controller B and, if it is not, the sequence jumps to routine (9) and if the bus 1 is occupied, the sequence proceeds to routine (7).

In the routine (7), it is examined whether the flag control signal on the bus 1 designates the principal controller A. Thus, while FIG. 1 shows a couple of controllers A and B interconnected by bus 1, the present system may comprise three or more controllers as interconnected with a common bus 1 and, therefore, as will be described hereinafter, the machine sending a flag control signal includes the machine number information specifying the recipient machine in the control signal and it is first inquired if the particular control signal is directed to itself (the principal machine). Thus, in the routine (7), a judgement is made if the machine number datum on a predetermined signal line of bus 1 is in agreement with the machine number entered by the machine number setting device 8 of the principal controller. If the numbers disagree, the sequence jumps to routine (9) and when the numbers are in agreement, the sequence proceeds to routine (8).

In the routine (8), the controller A receives the flag control signal directed to itself, controls the specified one of said flags $F_1$ through $F_4$ to a specified status and sends out an answer signal on a predetermined signal line of the bus 1.

Following the above-mentioned flag control signal reception routine, the routine (9) decodes the command code of the user instruction read out from the program memory 5 and the operation corresponding to the particular command code is performed. While the general command codes (a) through (i) mentioned hereinbefore and the respective operations need not be described in detail, the processing of the AND command, as an example, is shown as routine (10).

The routine (10) examines whether, among a large number of inputs or flags $F_1$ through $F_4$, an AND condition exists or not for the two signals in the user instruction as specified in [DATA-1] and [DATA-2] and, if there is no AND condition, the sequence returns to routine (3). Thus, unless the designated AND condition exists, the steps from routine (3) to routine (10) are repeated and the flag control signal reception routine is executed each time. Since, in the execution of a user instruction such that input statuses and chronological times are operational conditions, the flag control signal reception routine is sequentially executed even while the particular operational condition is valid, the principal controller A is capable of receiving the flag control signals issued by the other controller B even if such signals are issued at any arbitrary time. Now, the operations involved in the execution of the above-mentioned flag control instruction set in the program memory of the principal controller A will be described. At routine (2), the flag control instruction is read in, and at routine (9), the corresponding command code is decoded, whereupon the sequence proceeds to routine (11).

As shown in FIG. 2B, in the routine (11), it is inquired and judged whether the [DATA-2] in the flag control instruction specifies oneself (principal controller A) or the other controller B. Assuming that the principal controller A is not specified, the sequence advances to routine (12) and controls one of its own flags $F_1$ through $F_4$ which has been specified to a specified status. This is all for the flag control instruction and the sequence returns to routine (1). In this manner, the flag control instruction for the own machine A is processed within the central processing unit 2, without relation to the flag control circuit 7.

In the case of an instruction controlling any flag of the other machine B, the sequence proceeds from routine (11) to routine (13). At routine (13), the status of flag control circuit 7 is examined to see if the bus 1 is occupied by the own machine A. Since the bus 1 is not occupied in an initial condition, the sequence advances to routine (14), where an examination is made of an auxiliary flag f (which is so named in order to distinguish it from flags $F_1$ through $F_4$) which is set at routine (16) as will be described later. Since the auxiliary flag f has been set in the initial state, the sequence advances to routine (15). At routine (15), the operation for occupying the bus 1 with flag control circuit 7 is performed and the sequence then returns to routine (3).

Even if the operation for occupying the bus 1 is executed at routine (15), the own controller A cannot occupy the bus 1 so long as the bus 1 has been occupied by controller B. In this case, therefore, the sequence proceeds from (5) to (6) to (7) and, further, from routine (7) or (8) to routines (9)→(11)→(13)→(14)→(15). The routine (15) is repeatedly executed. And if the other controller B releases the bus 1 and the routine (15) is executed in that state, the bus 1 is now occupied by the own controller A.

Once the bus 1 is occupied by routine (15), the sequence proceeds from (5)→(9)→(11)→(13), and from routine (13) to routine (16) this time. And at routine (16), the above-mentioned auxiliary flag f is set and the sequence advances to routine (17).

At routine (17), the other-controller number data, flag number data and flag status data, i.e. flag control signal, are sent out to bus 1 through the flag control circuit 7 and the sequence returns to routine (3).

The other controller B receives the above-mentioned flag control signal from the controller A and, as described above, sends out an answer signal to bus 1 on completion of signal reception control. This answer signal has its effect on the flag control circuit 7 of the principal (own) controller A and, consequently, the occupation of bus 1 by controller A is released. However, as long as there is no return of an answer signal, the routine 17 is executed repeatedly in the principal controller 17, with the sending of a flag control signal being continued.

When an answer signal has come forth and the occupation of bus 1 by the own controller A has been released, the sequence proceeds from routine (13) to routine (14). Since, this time, the auxiliary flag f has been set, the sequence further advances to routine (18) where the flag control circuit 7 is reinstated to its initial state. The execution of the flag control instruction is thus completed and the sequence returns to routine (1).

FIG. 3 shows a typical circuit of said flag control circuit 7. In the figure, inverter $G_1$ is an open-collector element, and through a predetermined signal line of bus 1 which is connected to a terminal $6_1$, the outputs of inverters $G_1$ of own controller A and other controller B are respectively wired OR connected. The same is true of the output of NAND gate $G_2$.

The above-mentioned operation for occupying the bus 1 with routine (15) is the control which, referring to FIG. 3, output ports $1_0$ and $1_1$ of central processing unit 2 is rendered "H." In this control, if the output side of inverter $G_1$ is "H," the control causes the flip-flop FF to be set through gate $G_3$ and its output Q is rendered "H," while the output of inverter $G_1$ becomes "L." This condition is the state where the bus 1 is occupied by own controller A. As the flip-flop FF of any of the plurality of controllers connected to bus 1 is set in the above manner and, hence, the bus 1 is occupied, the terminal 6, is made "L" and as long as the terminal $6_1$ is "L," the other flip-flop FF cannot be set. Thus, the terminal $6_1$ is the input-output terminal for signal INH during use of the bus. Therefore, the judgement in routine (6) as to whether the other controller occupying the bus 1 can be obtained by making the output port $1_1$ "H" to open the gate $G_4$, taking the status of terminal $6_1$ into the input port $D_1$ and assessing the logic. Similarly, the aforementioned judgement in routine (5) or (13) as to whether the bus 1 is being occupied by own controller can be achieved by taking the status of output Q of its own flip-flop FF into input port $D_0$ and analyzing the logic.

The transfer and reception of the above-mentioned answer signals ANS are performed through terminal $6_3$. Thus, assuming that, in FIG. 3, the flip-flop FF of flag control circuit 7 has been set and the bus 1 occupied by the very controller, the flip-flop FF is reset when the other controller has issued an answer signal ANS and the terminal $6_3$ has been rendered "L." Conversely, in order to send out an answer signal ANS from the depicted controller to another controller, the output ports $I_1$ and $I_2$ of the central processing unit 2 are rendered "H." Since the output Q of flip-flop FF is "H", the output of gate $G_5$, i.e. terminal $6_3$, becomes "L."

In sending out a flag control singal from the controller shown in FIG. 3 to the other controller, the flip-flop FF is set in the first place and its output Q becomes "L" to open the output gate $G_6$ so that the other-controller number data and particular flag number data are sent out from ports $C_0$ to $C_3$ to terminals 64 through 67 via gate $G_6$ and the set/reset signal S/R outputted from port $I_2$ is sent out from output terminal $6_2$ through gate $G_2$. Conversely, when a flag control signal is taken from the other controller, gates $G_4$ and $G_7$ are opened by the "H" signal of port $I_1$, the machine number and flag number data are introduced into ports $C_0$ through $C_3$, and the set/reset signal S/R is introduced into port $D_2$.

It will be apparent from the above detailed description that the sequence control system according to this invention comprises one or a plurality of flags which can be freely controlled by predetermined user instructions and utilized as operational conditions by predetermined user instructions, flag control input and output terminals interconnected via a bus in one controller or between a plurality of identically constructed controllers, flag control signal sending means for sending out to said input-output terminals flag control signals for the other controller specified according to a predetermined user instruction, and flag control signal receiving means for examining sequentially the signals applied to said input-output terminal and, when a flag control signal directed to the very own controller has been applied thereto, controlling said flag in accordance with the control signal. Therefore, as an independent single controller, the system is capable of setting and resetting flags as desired according to user instructions and utilizing the status of the flag freely as an operational condition according to the user instruction, thus allowing a sequence program more complicated than those hitherto utilized to be employed.

Furthermore, when a plurality of controllers herein described are used with said input-output terminals connected via flag control bus, the flags of other controller B can be freely set and reset by the user instructions set in principal controller A and the status of the flag can be utilized as an operational condition in accordance with the user instruction set in the same controller B. In this manner, interlocks and synchronizations can be established between or among a plurality of controllers so as to implement various complicated parallel operations.

Now, a very simple example of application will be explained below for reference. At the 20th step in controller A, a command to set the flag $F_1$ of controller B is set and at the 10th step in controller B, a command (e.g. OR command) to advance the process by one step on condition that the flag $F_1$ is set. Now, if the controller B reaches said 10th step before the controller A advances to said 20th step, the controller B stands by at the 10th step and its operation proceeds only after the controller A has reached said 20th step. By such a combination of flag control functions, the desired complicated parallel operations are enabled. Moreover, the implementation of such a complicated parallel operation need only the number of controllers which is commensurate with the scale of operation and the user need not purchase a large-scale equipment. Moreover, the system scale can be freely increased or decreased as a major advantage of this invention.

What is claimed is:

1. A sequence controller for carrying out process steps, which reads sequential user instructions which have been entered into a program memory by a user and then transmits a sequence of output statuses in response to statuses of inputs based on said user instructions, comprising:

a central processing unit;

a program memory operatively connected to said central processing unit;

an input circuit operatively connected to said central processing unit for receiving status inputs;

an output circuit operatively connected to said central processing unit for transmitting status outputs;

one or more flags controlled by predetermined user instructions, said flags being operatively connected to said central processor and utilized to show operational conditions;

a flag control input-output terminal connectable to a similar flag control input-output terminal of another similar sequence controller through a common bus;

flag control sending means operably connecting said central processing unit to said input-out terminal for sending out to said input-output terminal a flag control signal directed to another controller according to a predetermined user instructions; and flag control signal receiving means, operably connecting said central processing unit to said input-output terminal for sequentially examining signals applied to said input-output terminal, and, when a flag control signal directed to the particular controller itself is applied, controlling a flag of that particular controller in accordance with said control signal.

2. The sequence controller of claim 1, wherein each of said flags comprises a one-bit memory location.

3. The sequence controller of claim 1, wherein said controller further includes a flag output circuit means operatively connected to said one or more flags for providing switched outputs corresponding to the statuses of said one or more flags.

* * * * *